A. J. ROWLEDGE.
VARIABLE SPEED GEAR.
APPLICATION FILED MAY 1, 1916.

1,256,371.

Patented Feb. 12, 1918.
5 SHEETS—SHEET 1.

A. J. ROWLEDGE.
VARIABLE SPEED GEAR.
APPLICATION FILED MAY 1, 1916.
1,256,371.
Patented Feb. 12, 1918.
5 SHEETS—SHEET 2.
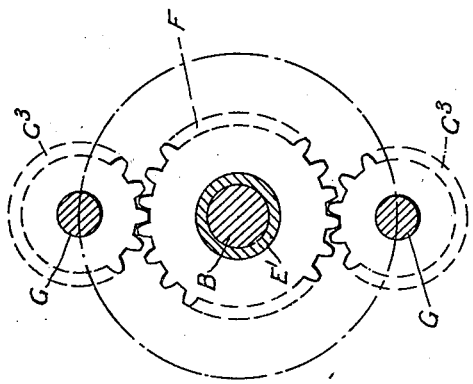
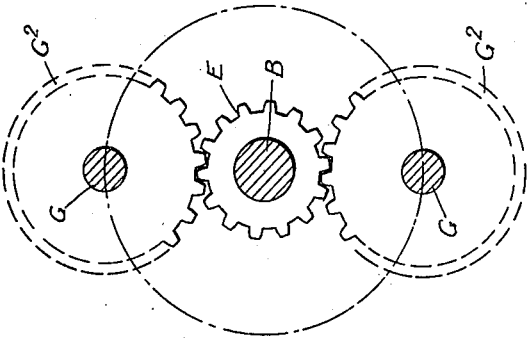
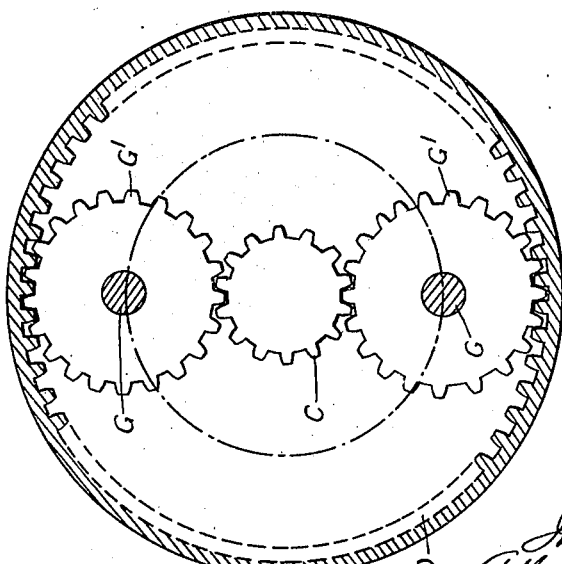

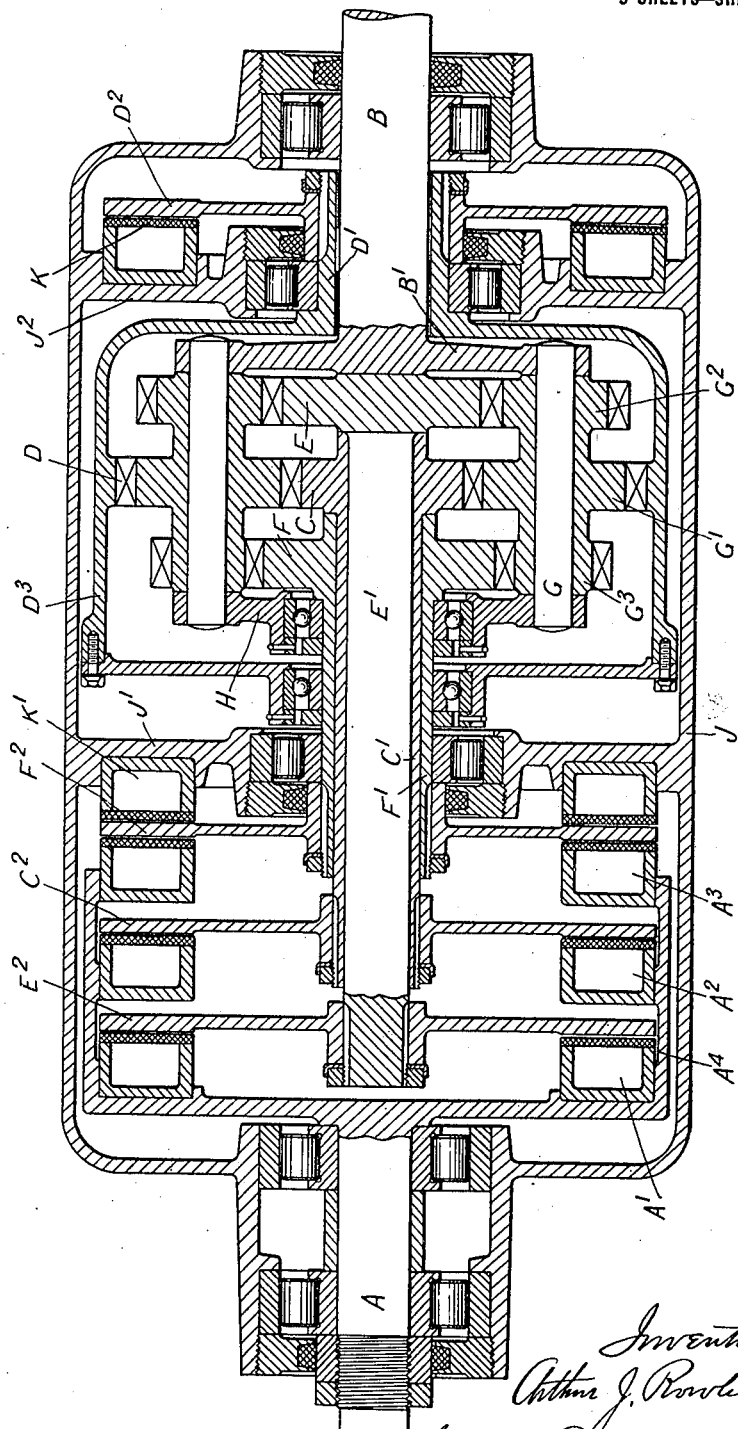

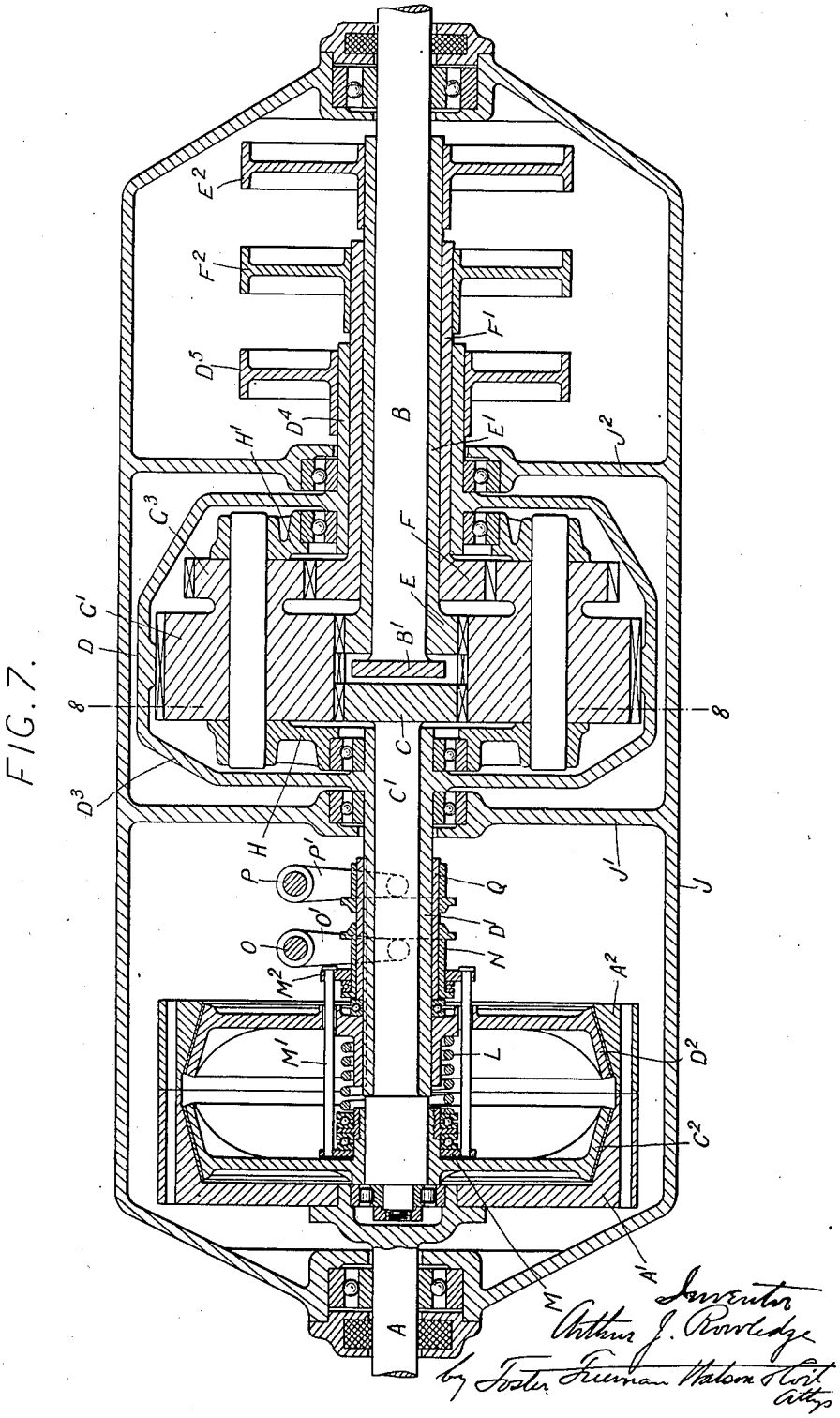

UNITED STATES PATENT OFFICE.

ARTHUR JOHN ROWLEDGE, OF LONDON, ENGLAND, ASSIGNOR TO D. NAPIER & SON LIMITED, OF LONDON, ENGLAND.

VARIABLE-SPEED GEAR.

1,256,371.  Specification of Letters Patent.  Patented Feb. 12, 1918.

Application filed May 1, 1916. Serial No. 94,841.

*To all whom it may concern:*

Be it known that I, ARTHUR JOHN ROWLEDGE, a subject of the King of England, residing at London, in England, have invented certain new and useful Improvements in Variable-Speed Gears, of which the following is a specification.

This invention relates to variable speed gearing of the spur wheel epicyclic type in which the speed variations are effected by means of clutches and brakes which are operative on certain members of the gear and has for its object to provide a simple form of such a gear which will enable a plurality of speeds to be obtained in the forward direction and a reverse. The clutches and brake in the improved gear may be operated and controlled in various known ways either mechanically or electrically.

According to this invention the driving and driven shafts are disposed coaxially and to the driven shaft is connected one or more planetary members while a set of sun wheels is mounted coaxial with but separate from the driving and driven shafts one of these sun wheels being in the form of an internally toothed ring. All these wheels gear with wheels of the planetary member and at least two and in some cases three clutches and at least two and in some cases three brakes so control the separate sun wheels by imparting rotation through the clutches and by locking certain of these wheels by the brakes that power will be transmitted through the planetary members to the driven shaft and the latter can be driven at the different predetermined speeds. The planetary member, or each of them if more than one is provided, comprises integral wheels which are preferably of two but sometimes may be of three different sizes the number of wheels in each member being two or three. The number of the sun wheels including the toothed ring is four and these wheels are preferably of three different sizes though sometimes they may be of four different sizes. The duplication of one of these wheels when they are of three different sizes is necessary to enable the fourth speed to be obtained and is due to the fact that it is practically impossible to provide both driving clutches and brakes which will be separately operative on two sun wheels in a gear of this type. If, however, as in the preferred present construction one of these wheels is duplicated it becomes possible to apply a brake to one of them and to drive the other through a clutch while the effect in the gear is the same by reason of the duplicate wheels being both in mesh with twin integral planet wheels. In place of twin wheels two wheels of different diameters may be used the difference in their diameters being arranged with a view to the obtainment of some particular desired relationship between the several speeds which it may not be possible to get if the wheels in question are formed as twins. When not formed as twins obviously the sizes of the planet wheels with which they gear differ to a corresponding extent.

The accompanying drawings illustrate by way of example several constructions of variable speed gear. For convenience and for the sake of clearness these drawings are to a considerable extent diagrammatic. In these drawings, Figure 1 is a longitudinal sectional elevation of one construction of a four speed gear in accordance with the present invention electromagnetic clutches and brakes being shown as the means by which the variations in speed are brought about.

Fig. 2 is a diagrammatic transverse section on the line 2—2 of Fig. 1.

Fig. 3 is a similar section on the line 3—3 of Fig. 1.

Fig. 4 is a similar section on the line 4—4 of Fig. 1.

Fig. 6 is a similar view of yet a further modification of the gear arranged to be similarly controlled.

Fig. 7 is a similar view of a modified form of the four speed gear shown in Fig. 1 and illustrating one method of controlling the improved gear by mechanical clutches and brakes.

Like letters indicate like parts throughout the drawings.

Referring to the construction illustrated in Figs. 1 to 4 inclusive, the motor or driving shaft A has mounted upon it two clutch members A', A² which in this case are of the electromagnetic type. Coaxially disposed with relation to the driving shaft A is the driven shaft B. A toothed wheel C is secured on one end of a shaft C' the other end of which carries a clutch member C² adapted to engage the driving clutch member A'. The shaft C' is disposed coaxial with the driving and driven shafts A and B and between the ends of these two shafts. The wheel C constitutes one of the sun wheels of the gear and may conveniently be referred to as the first driving sun wheel. An internally toothed ring D is carried by a sleeve D' loosely mounted on the shaft C' and toward one end of this sleeve is disposed a clutch member D² adapted to engage the driving clutch member A². The toothed ring D constitutes one of the sun wheels of the gear and may be designated the second driving sun wheel. The toothed ring D lies in the plane of the sun wheel C and the connection between it and the sleeve D' is conveniently in the form of a casing or cage D³, which incloses all the gear wheels including the planetary members. At the driven shaft end this casing D³ is carried by a sleeve D⁴ on the driven shaft B and on the end of this sleeve is a brake member D⁵. Toward the end of the driven shaft B is a toothed wheel E carried on one end of a sleeve E' which is loosely mounted on the driven shaft B. On the opposite end of the sleeve E' is a brake member E². In the construction here described the toothed wheel E is of the same diameter as the wheel C and the object in employing these twin wheels in this case is to enable the toothed wheel C not only to be driven through its clutch member C² but also a brake to be applied with the same effect as if it were applied to the wheel C. It is not practically possible however to provide the wheel C with both clutch and brake members owing to the presence of the second clutch member D² controlling the toothed ring D, hence the duplication of the wheel C becomes necessary. A fourth sun wheel F is mounted on one end of a sleeve F' which is carried by the sleeve E' and in turn carries the sleeve D⁴ of the toothed ring cage D³. On the other end of the sleeve F' is a brake member F².

It will thus be seen that while four sun wheels including the toothed ring are employed in this construction these wheels are of only three different sizes owing to the wheels C and E being twins. In the gear illustrated the sun wheels C and E are smaller than the wheel F which is in turn smaller than the toothed ring D.

Figure 8:
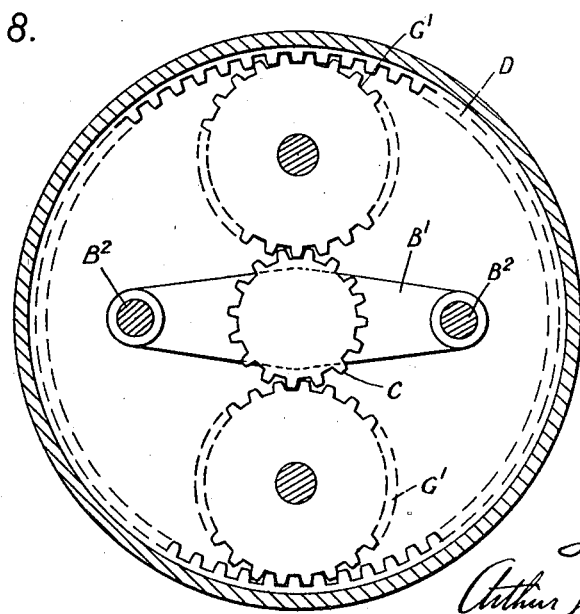
Fig. 8 is a diagrammatic transverse section on the line 8—8 of Fig. 7.

The planetary member comprises a spindle G on which are loosely mounted three toothed wheels G', G², G³ all constructed integral. The spindle G is carried at its ends by two members H H' which are respectively supported, conveniently with ball or roller bearings interposed, on the sleeves D' and D⁴. The planetary member is connected to the driven shaft B by a spider B' or the like which loosely engages some portion of the hub of the integral planetary wheels. In the construction shown the spider B' is disposed between the planetary wheels G' and G². Thus rotary motion imparted to the planetary member about the gear axis is communicated to the driven shaft B. For convenience the planetary member is duplicated as shown each of these members being oppositely disposed with relation to the axis of the gear. The planetary wheels G' mesh with the first sun wheels C and also with the toothed ring D. The planetary wheels G² mesh with the sun wheel E while the planetary wheels G³ gear with the sun wheel F. Owing to the sun wheels C and E being twins it is obviously necessary that the planet wheels G' and G² must also be twins. If the planetary system is connected to the driven shaft B by a spider B' which directly engages the planet wheels in the manner shown the employment of two distinct though integral planet wheels G' and G² is necessary. If, however, the spider B' is otherwise constructed and arranged as is possible so as to engage the members H H' which support the planetary wheels the two wheels G' G² may be formed as one wheel of sufficient breadth to gear with both of the sun wheels C and E. With such a construction which is illustrated in Figs. 7 and 8 each planetary member comprises only two wheels of different sizes.

A fixed casing J incloses the whole gear together with the clutch and brake members and at the driven shaft end of this casing are mounted three brake members K K' and K². The brake member K is arranged so as to engage the brake member E² of the sun wheel E, the brake member K' engages the brake member F² of the sun wheel F while the brake member K² is adapted to engage the brake member D⁵ of the toothed ring D. The casing J is provided with partitions J' and J² which divide the interior of the casing into three compartments. In one of these compartments at one end of the casing lie the clutch members while the brake members are all disposed in another compartment at the other end of the casing. The gear wheels thus lie in the central compartment. The partition J' extends inwardly to the sleeve D' and a ball or roller bearing may conveniently be here disposed. Similarly the partition J² extends inwardly to the sleeve D⁴ and a ball or like bearing may also be arranged there. By thus dividing up the casing it is possible to so isolate the gear wheels that fragments of metal which may be worn off the clutch and brake members and other foreign matter which may be present in the clutch and brake compartments respectively is prevented from entering the central gear compartment and by getting into the oil which surrounds the gear wheels cause risk of damage to the gears. It also becomes possible with this arrangement to maintain either the clutch or brake members or both dry or to run one or other of these sets of members in oil. This arrangement is particularly advantageous where the clutches and brakes are as illustrated of the electromagnetic type but it is also useful where mechanically operated clutches and brakes are used.

The various speeds are obtained in the following manner in a gear thus constructed. It will be understood that in each case only those clutch and brake members which are indicated are operative, the other clutch and brake members being out of action.

For the first or lowest speed the first sun wheel C is driven and the second sun wheel that is to say the toothed ring D is fixed. This is effected by engaging the clutch members A' and $C^2$ and by applying the brake $K^2$ to the brake member $D^5$ of the toothed ring D.

For the second speed the toothed ring D is driven and the sun wheel F is fixed. This is effected by engaging the clutch members $A^2$ and $D^2$ and by applying the brake K' to the brake member $F^2$ of the sun wheel F.

For the third speed the toothed ring D is again driven but in this case the sun wheel E is fixed. The driving of the toothed ring is effected as before but the sun wheel is braked by the application to its brake member $E^2$ of the brake K.

For the fourth speed both the wheel C and the toothed ring D are driven by the engagement of both driving clutch members A' $A^2$ with the clutch members $C^2$ and $D^2$ respectively. In this case no brakes are employed and the whole gear is locked so that there is a direct drive and no rotation takes place between the several gear elements.

In order to obtain the reverse the sun wheel C is driven and the sun wheel F is fixed by engagement of the brake members K' and $F^2$.

Figure 1:
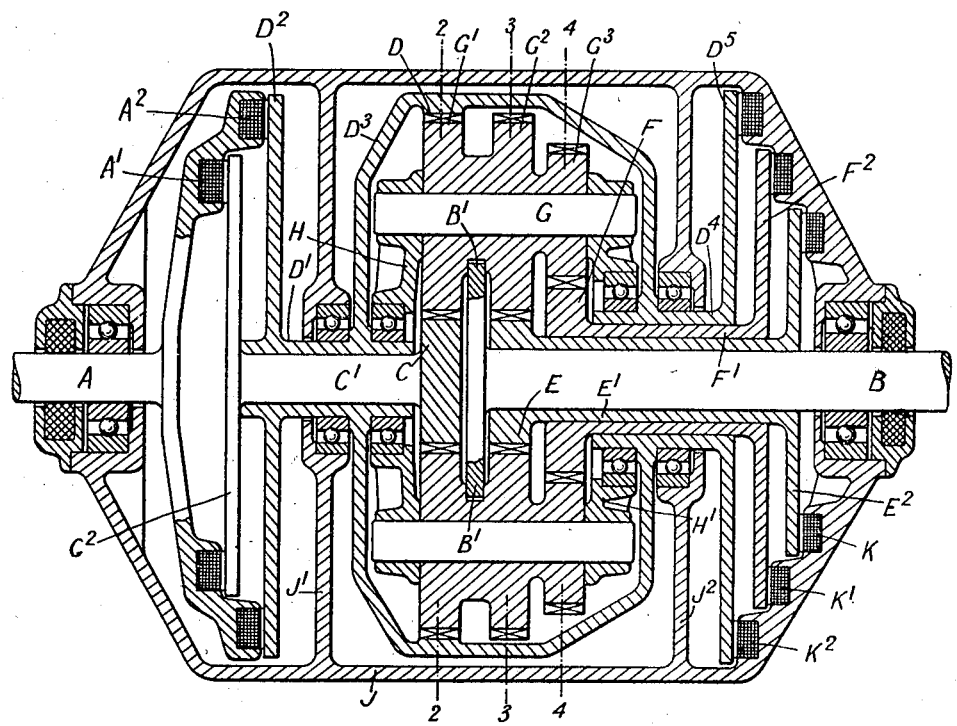
Figure 5:
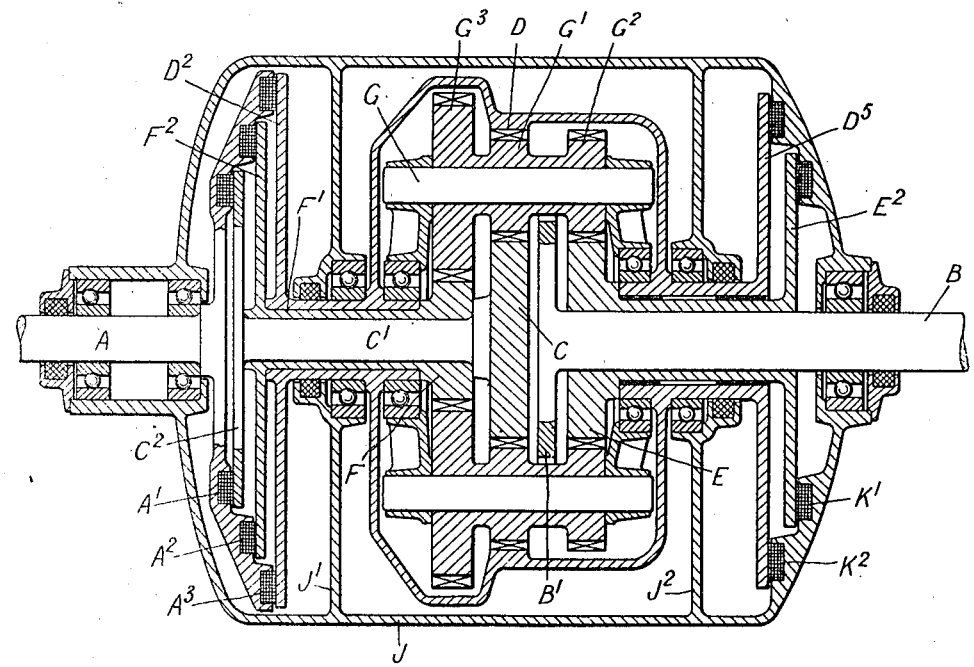
Fig. 5 is a longitudinal sectional elevation of a modified form of the improved gear also arranged to be controlled by electromagnetic clutches and brakes.

Turning now to the construction shown in Fig. 5, as will be seen this is very similar to the construction shown in Fig. 1 from which it differs principally by reason of the fact that in place of the gear being controlled by two clutches and three brakes the gear shown in Fig. 5 is controlled by three clutches and two brakes while the sizes and disposition of the several wheels are somewhat altered. In this case the sleeve F' carrying the wheel F is rotatably mounted on a shaft C' which carries the wheel C. At the opposite end to the wheel F the sleeve F' carries a clutch member $F^2$ instead of a brake member. The driving shaft A is here provided with three clutch members namely one A' adapted to engage the clutch member $C^2$ controlling the wheel C, another $A^2$ adapted to engage the clutch member $F^2$ of the wheel F and a third $A^3$ adapted to engage the clutch member $D^2$ controlling the toothed ring D. The two fixed brake members K' and $K^2$ engage respectively the brake members $E^2$ and $D^5$ controlling the wheel E and the toothed ring D. In this construction the dimensions of the several wheels are varied as compared with the construction shown in Fig. 1. The twin sun wheels C and E are in this case larger than the wheel F while naturally the dimensions of the planet wheels which gear with them are correspondingly altered. Thus the twin planet wheels G' and $G^2$ are of less diameter than the planet wheel $G^3$ which latter gears with the sun wheel F and has its position on the planet wheel spindle G arranged accordingly.

The several speeds are obtained in this construction in the following way:—

For the first or lowest speed the sun wheel F is clutched to the motor or driving shaft A and the brake $K^2$ is applied so as to fix the toothed ring D.

For the second speed the sun wheel C is clutched to the driving shaft A and the toothed ring D is again fixed by its brake.

For the third speed the toothed ring D is clutched to the driving shaft and the sun wheel E is fixed by the brake K'.

For the fourth speed which is the highest speed and by means of which a direct drive is obtained any two or all of the clutches A' $A^2$ and $A^3$ are put into operation so as to drive any two or all of the sun wheels C, F and D. The gear wheels are thus locked so that no relative rotation of the parts in the gear box occur.

To obtain the reverse the sun wheel F is clutched to the driving shaft A and the sun wheel E is fixed by its brake.

It will be noted that in this construction as in that previously described all the clutches are arranged in one end compartment of the outer casing J while the brakes are arranged in the other end compartment, the clutch and brake containing chambers being separated from the central gear containing chambers by the partitions J' and $J^2$.

Referring to the further modification of the improved gear shown in Fig. 6 it will be seen that this differs from the gear first described and illustrated in Fig. 1 in the following respects: Like the gear shown in Fig. 5 it is controlled by three clutches and two brakes but in place of both brakes being disposed at one end of the gear while all the clutches are arranged at the other end one brake is placed in the same compartment of the casing J as the clutches. Further, the dimensions of the wheels of the gear are varied inasmuch as no twin wheels are employed but all the wheels of a planetary member are of different diameters and similarly all the sun wheels are of different diameters. Finally the toothed ring D is arranged so that it can be braked only and not driven while all the three sun wheels C, E and F are provided with clutches, the sun wheel F being also provided with a brake. In this case in order to provide clutches operative on the three sun wheels C, E, and F while maintaining their relative positions with the wheels E and F on either side of the wheel C, the wheel E is mounted on a shaft E' in place of a sleeve and the wheel C is disposed on a sleeve C' which is carried by the shaft E'. The sleeve F' is in turn carried on the sleeve C'.

In this form of the gear it will be seen that the electromagnetic clutches are somewhat differently constructed and arranged on the end of the driving shaft A in that the clutch members are all of the same diameter being carried on a sleeve $A^4$. The clutch members $C^2$, $E^2$ and $F^2$ of the sun wheels are also all of the same diameter. The brake member K' is mounted on the partition J' of the outer casing J and is disposed opposite to the driving clutch member $A^3$ with the member $F^2$ of the wheel F disposed between them. Both the clutch member $A^3$ and the brake member K' thus act on this member $F^2$. The brake member K is similarly mounted on the partition $J^2$ and acts on the brake member $D^2$ of the internally toothed ring D.

The toothed ring D here gears with the planetary wheel G' of largest diameter which in turn meshes with the sun wheel C. The sun wheel E which is of intermediate dimensions meshes with the planet wheel $G^2$ also of intermediate dimensions while the largest wheel F meshes with the smallest planet wheel $G^3$.

The spider B' which serves to connect the driven shaft to the planetary member is formed conveniently as a disk which carries one end of each planetary spindle G the other ends of these spindles being carried by the supporting member H.

The several speeds in this construction are obtained in the following manner:—

For the first or lowest speed the sun wheel C is clutched to the motor shaft and driven while the toothed ring D is fixed by its brake.

For the second speed the sun wheel E is driven and the toothed ring D again braked.

For the third speed the sun wheel F is driven and the toothed ring D once more braked.

In order to obtain the fourth speed or direct drive any two of the sun wheels which are provided with clutches are driven for example the wheels C and E or the wheels C and F or if preferred the clutches or all these three sun wheels may be engaged. No brakes are in operation. To obtain the reverse the sun wheel C is driven and the brake applied to the sun wheel F.

Fig. 7 illustrates a four speed gear which is a slight modification of that illustrated in Fig. 1 and is moreover shown as being controlled by clutches and brakes which are mechanically operated instead of being of the electromagnetic type. The difference in this form of the gear is that in place of the twin planet wheels G' $G^2$ shown in the gear illustrated in Fig. 1 a single wheel G' of double width is employed. This planet wheel G' gears equally with the sun wheel C and the sun wheel E. The employment of this broad planet wheel necessitates a slight modification in the connection between the driven shaft B and the planetary members H H' which carry the planet wheels. The spider or cross-piece B' which is mounted on the end of the driven shaft B is here disposed as shown in Fig. 8 so as to extend in opposite directions between the planet wheels. Each end of the cross-piece B' engages a bar $B^2$ and the ends of these bars are securely fixed to the end members H H' of the planetary system.

The several speeds in this form of gear are obtained in the same way as in the gear illustrated in Fig. 1.

Turning now to the mechanical clutches and brakes which are here shown by way of example as applied to this form of gear, it is to be understood that mechanically operated clutches and brakes of the same or other constructions may be applied equally well to either of the other forms of the gear indicated above. The clutches as illustrated are of the cone type but obviously they may be plate clutches or of the expanding type. The cone clutch member $C^2$ is carried on the end of the shaft C' so that it can slide axially thereon. The clutch member $D^2$ is similarly carried on the sleeve D'. Between the hubs of these clutch members is disposed a coiled spring L which presses equally in opposite directions the two cones against the conical clutch members A' $A^2$ mounted on the driving shaft A. Between the end of the spring L which bears against the clutch member $C^2$ and the hub of this clutch member is a loose collar M connected by rods M' disposed parallel to the gear axis with a loose collar $M^2$ disposed on an axially sliding sleeve N mounted on the sleeve D'. On a rockshaft O is mounted a lever O' which engages the sleeve N in some convenient manner so that when the shaft O is rocked the sleeve N can be moved axially. When thus moved to the right as shown in Fig. 7 the spring L will be compressed and the clutch member C² disengaged from the clutch member A' by reason of the pull exerted through the rods M'. When the rockshaft O is freed the spring L will cause the clutch members C² and A' to engage. A second rockshaft P carries a lever P' which engages in some convenient manner a sleeve Q mounted so that it can slide axially on the sleeve D'. This sleeve Q actually lies between the sleeve N and the sleeve D' and the end of the sleeve Q bears against the hub of the clutch member D². When the shaft P is rocked the sleeve Q will be moved toward the left as shown in the drawing and the spring L will consequently be depressed as the clutch member D² is moved out of engagement with the clutch member A². On releasing the rockshaft P the clutch members A² and D² will again come into engagement. By means of this clutch mechanism it is possible to engage or hold out of engagement the two clutch members C² and D² either separately or simultaneously. This method of arranging and operating the clutches is similar to certain known clutch constructions and is illustrated by way of example to show how mechanically operated clutches may be employed for controlling the improved gears with the object of effecting the necessary speed variations.

The mechanically operated brakes employed in this case may be of some suitable type but as illustrated each brake comprises a drum such as D⁵ E² and F² to each of which may be applied in some convenient known manner a contracting brake band not shown in the drawings. Brakes of the expanding or other type may, however, be employed if desired. These brakes and clutches are conveniently operated by pedals, levers or other suitable mechanism so arranged as to enable the clutches and brakes to be manipulated in the combinations necessary to effect the desired speed changes.

It will be understood that in either of the above mentioned gears the dimensions of the several wheels may be varied in order to obtain any particular speed ratios that may be desired. As shown by the example of the gear illustrated in Fig. 6 it is not necessary to employ twin sun wheels and corresponding twin planet wheels as by making these pairs of wheels of different sizes a difference of speed ratio is obtainable.

The clutches and brakes if of the electromagnetic type may be controlled in various ways as found convenient. In some cases it may be desirable to construct and arrange the clutches so that they are mechanically operated while the brakes are of the electromagnetic type or conversely electromagnetic clutches may be used in combination with mechanically operated brakes.

What I claim as my invention and desire to secure by Letters Patent is:—

1. In an epicyclic variable speed gear of the spur wheel type, the combination of a driving shaft, a plurality of clutch members mounted on said shaft, a driven shaft coaxial with the driving shaft, a planetary member connected with the driven shaft and comprising a set of planet wheels, all of which are integral and adjacent each other, a set of gears separate from but mounted coaxial with the driving and driven shafts and gearing with the said planet wheels, one of said gears being an internally toothed ring, a plurality of clutch members connected with some of said gears and coöperating with a plurality of the clutch members on the driving shaft, and a plurality of brakes controlling certain of said gears, all of said gears being directly controlled by the clutches and brakes.

2. In an epicyclic variable speed gear of the spur wheel type, the combination of a driving shaft, a plurality of clutch members mounted on said shaft, a driven shaft coaxial with the driving shaft, a planetary member connected with the driven shaft and comprising a set of integral planet wheels, of not less than two and not more than three different sizes, a set of gears separate from but mounted coaxial with the driving and driven shafts and gearing with the planet wheels, one of said gears being an internally toothed ring, a plurality of clutch members connected with certain of said gears and coöperating with the clutch members on the driving shaft, and a plurality of brakes controlling a plurality of said gears, all of said gears being directly controlled by the clutches and brakes.

3. In an epicyclic variable speed gear of the spur wheel type, the combination of a driving shaft, a plurality of clutch members mounted on said shaft, a driven shaft coaxial with the driving shaft, a planetary member connected with the driven shaft and comprising a set of integral planet wheels, a set of gears of not less than three and not more than four different sizes separate from but mounted coaxial with the driving and driven shafts and gearing with the planet wheels, one of said gears being an internally toothed ring, a plurality of clutch members connected with certain of said gears and coöperating with the clutch members on the driving shaft, and a plurality of brakes coöperating with a plurality of said gears, all of said gears being directly controlled by the clutches and brakes.

4. In an epicyclic variable speed gear of the spur wheel type, the combination of a driving shaft, a plurality of clutch members mounted on said shaft, a driven shaft coaxial with the driving shaft, a planetary member connected with the driven shaft and comprising a set of integral planet wheels of not less than two and not more than three different sizes, a set of gears of not less than three and not more than four different sizes separate from but mounted coaxial with the driving and driven shafts and gearing with the planet wheels, one of said gears being an internally toothed ring, a plurality of clutch members connected with a plurality of said gears and coöperating with the clutch members on the driving shaft, and a plurality of brakes coöperating with a plurality of said gears, all of said gears being directly controlled by the clutches and brakes.

5. In an epicyclic variable speed gear of the spur wheel type, the combination of a driving shaft, a plurality of clutch members mounted on said shaft, a driven shaft coaxial with the driving shaft, a planetary member connected with the driven shaft and comprising a set of integral planet wheels, a set of four gears separate from but mounted coaxial with the driving and driven shafts and gearing with the planet wheels, one of said gears being an internally toothed ring, a plurality of clutch members each connected with one of said gears and coöperating with the clutch members on the driving shaft, and a plurality of brakes coöperating with a plurality of said gears, all of said gears being directly controlled by the clutches and brakes.

6. In an epicyclic variable speed gear of the spur wheel type, the combination of a driving shaft, a plurality of clutch members mounted on said shaft, a driven shaft coaxial with the driving shaft, a planetary member connected with the driven shaft and comprising a set of integral planet wheels in number not less than two and not more than three, a set of four gears separate from but mounted coaxial with the driving and driven shafts and gearing with the planet wheels, one of said gears being an internally toothed ring, a plurality of clutch members each connected with one of said gears and coöperating with the clutch members on the driving shaft, and a plurality of brakes coöperating with a plurality of said gears, all of said gears being directly controlled by the clutches and brakes.

7. In an epicyclic variable speed gear of the spur wheel type, the combination of a driving shaft, a plurality of clutch members mounted on said shaft, a driven shaft coaxial with the driving shaft, a planetary member connected with the driven shaft and comprising a set of integral planet wheels of not less than two and not more than three different sizes and in number not less than two and not more than three, a set of gears separate from but mounted coaxial with the driving and driven shafts and gearing with the planet wheels, one of said gears being an internally toothed ring, a plurality of clutch members each connected with one of said gears and coöperating with the clutch members on the driving shaft, and a plurality of brakes each coöperating with one of said gears, all of said gears being directly controlled by the clutches and brakes.

8. In an epicyclic variable speed gear of the spur wheel type, the combination of a driving shaft, a plurality of clutch members mounted on said shaft, a driven shaft coaxial with the driving shaft, a planetary member connected with the driven shaft and comprising a set of integral planet wheels, of not less than two and not more than three different sizes, a set of four gears separate from but mounted coaxial with the driving and driven shafts and gearing with the planet wheels, one of said gears being an internally toothed ring, a plurality of clutch members connected with a plurality of said gears and coöperating with the clutch members on the driving shaft, and a plurality of brakes coöperating with a plurality of said gears, all of said gears being directly controlled by the clutches and brakes.

9. In an epicyclic variable speed gear of the spur wheel type, the combination of a driving shaft, a plurality of clutch members mounted on said shaft, a driven shaft coaxial with the driving shaft, a planetary member connected with the driven shaft and comprising a set of integral planet wheels, of not less than two and not more than three different sizes, a set of gears, of not less than three and not more than four different sizes and in number not less than three and not more than four, separate from but mounted coaxial with the driving and driven shafts and gearing with the planet wheels, one of said gears being an internally toothed ring, a plurality of clutch members each connected with one of said gears and coöperating with the clutch members on the driving shaft, and a plurality of brakes coöperating with certain of said gears, all of said gears being directly controlled by the clutches and brakes.

10. In an epicyclic variable speed gear of the spur wheel type, the combination of a driving shaft, a plurality of clutch members mounted on said shaft, a driven shaft coaxial with the driving shaft, a planetary member connected with the driven shaft and comprising a set of integral planet wheels, a set of four gears, of not less than three and not more than four different sizes, mounted co-axial with the driving and driven shafts, and gearing with the planet wheels, one of said gears being an internally toothed ring, a plurality of clutch members each connected with one of said gears and coöperating with the clutch members on the driving shaft, and a plurality of brakes coöperating with a plurality of said gears, all of said gears being directly controlled by the clutches and brakes.

11. In an epicyclic variable speed gear of the spur wheel type, the combination of a driving shaft, a plurality of clutch members mounted on said shaft, a driven shaft coaxial with the driving shaft, a planetary member connected with the driven shaft and comprising a set of integral planet wheels, of not less than two and not more than three different sizes and in number not less than two and not more than three, a set of gears of not less than three and not more than four different sizes, mounted coaxial with the driving and driven shafts and gearing with the planet wheels, one of said gears being an internally toothed ring, a plurality of clutch members each connected with one of said gears and coöperating with the clutch members on the driving shaft, and a plurality of brakes each coöperating with one of said gears, all of said gears being directly controlled by the clutches and brakes.

12. In an epicyclic variable speed gear of the spur wheel type, the combination of a driving shaft, a plurality of clutch members mounted on said shaft, a driven shaft coaxial with the driving shaft, a planetary member connected with the driven shaft and comprising a set of integral planet wheels, of not less than two and not more than three different sizes, a set of four gears, of not less than three and not more than four different sizes, mounted coaxial with the driving and driven shafts and gearing with the planet wheels, one of said gears being an internally toothed ring, a plurality of clutch members each connected with one of said gears and coöperating with the clutch members on the driving shaft, and a plurality of brakes each coöperating with one of said gears, all of said gears being directly controlled by the clutches and brakes.

13. In an epicyclic variable speed gear, of the spur wheel type, the combination of a driving shaft, a plurality of clutch members mounted on said shaft, a driven shaft coaxial with the driving shaft, a planetary member connected with the driven shaft and comprising a set of integral planet wheels, of not less than two and not more than three different sizes and in number not less than two and not more than three, a set of four gears, of not less than three and not more than four different sizes, mounted coaxial with the driving and driven shafts and gearing with the planet wheels, one of said gears being an internally toothed ring, a plurality of clutch members each connected with one of said gears and coöperating with the clutch members on the driving shaft, and a plurality of brakes controlling a plurality of said gears, all of said gears being directly controlled by the clutches and brakes.

14. In an epicyclic variable speed gear of the spur wheel type, the combination of a driving shaft, a plurality of clutch members mounted on said shaft, a driven shaft coaxial with the driving shaft, a planetary member connected with the driven shaft and comprising three integral planet wheels, three gears separate from but mounted coaxial with the driving and driven shafts, and each gearing with a planet wheel, a gearing in the form of an internally toothed ring mounted coaxial with but separate from the driving and driven shafts and gearing with one of the planet wheels, a plurality of clutch members each connected with one of said gears or ring, and a plurality of brakes directly controlling a plurality of said gears and ring.

15. In an epicyclic variable speed gear of the spur wheel type, the combination of a driving shaft, a driven shaft coaxial with the driving shaft, a planetary member composed of a set of integral planet wheels and connected to the driven shaft, a set of wheels mounted coaxial with but separate from the driving and driven shafts one of these wheels being in the form of an internally toothed ring and all these wheels gearing with said planet wheels, a plurality of clutches operative to separately drive certain of the wheels mounted coaxial with the shafts, a plurality of brakes operative to separately fix certain of the last said wheels, one of these wheels on which a brake is operative being also capable of being driven through one of the said clutches, a casing inclosing the gear wheels the clutches and the brakes, and partitions in this casing which so divide it into compartments that the clutches and brakes are separated from the gear wheels as set forth.

16. In an epicyclic variable speed gear of the spur wheel type, the combination of a driving shaft, a driven shaft coaxial with the driving shaft, a planetary member composed of a set of integral planet wheels and connected to the driven shaft, a set of wheels mounted coaxial with but separate from the driving and driven shafts and disposed on either side of the connection between the end of the driven shaft and the planetary member all these wheels gearing with planet wheels, a wheel in the form of an internally toothed ring coaxial with but separate from the driving and driven shafts and gearing with one of the planet wheels, a plurality of clutches disposed at that side of the group of gear wheels which is adjacent to the end of the driving shaft these clutches being operative to separately couple certain of the gear wheels to the driving shaft, a plurality of brakes disposed at the side of the group of gear wheels which is opposite to the clutches these brakes being operative to hold
5 certain of the gear wheels against rotation, a casing inclosing the gear wheels the clutches and the brakes, and partitions in this casing which so divide it into compartments that the clutches and brakes are separated from each other and from the gear wheels as set forth.

In testimony whereof I have signed my name to this specification in the presence of two subscribing witnesses.

ARTHUR JOHN ROWLEDGE.

Witnesses:
 EUSTACE HENRY BURKE,
 ERNEST PARK.